United States Patent [19]

Logsdon

[11] 4,265,058
[45] May 5, 1981

[54] ROOF FLASHING STRUCTURES

[75] Inventor: Duane D. Logsdon, Fullerton, Calif.

[73] Assignee: The Logsdon Foundation, Stanton, Calif.

[21] Appl. No.: 42,216

[22] Filed: May 24, 1979

Related U.S. Application Data

[63] Continuation-in-part of Ser. No. 883,420, Mar. 6, 1978, Pat. No. 4,160,347.

[51] Int. Cl.³ .............................................. E04D 1/36
[52] U.S. Cl. ......................................... 52/58; 52/199; 285/43
[58] Field of Search .................... 52/199, 58, 218, 219; 285/42, 43, 44; 277/183, 184, 185, 186

[56] References Cited

U.S. PATENT DOCUMENTS

| | | | |
|---|---|---|---|
| 3,313,559 | 4/1967 | Kifer | 285/43 |
| 4,010,578 | 3/1977 | Logsdon | 52/58 |
| 4,130,286 | 12/1978 | Ernst et al. | 277/183 X |
| 4,160,347 | 7/1979 | Logsdon | 52/218 X |

Primary Examiner—Price C. Faw, Jr.
Assistant Examiner—Carl D. Friedman
Attorney, Agent, or Firm—K. H. Boswell; Edward D. O'Brian

[57] ABSTRACT

A roof flashing structure of the type having a generally flat plate with an upstanding housing integrally attached thereto can be improved by forming the upmost periphery of said housing such that it has an inner wall and an outer wall with a channel in between these walls. An elastomeric sealing member has a support wall with a plurality of annular pipe sealing flanges extending from said support wall. Also attaching to the support wall is a skirt which extends downward from the annular wall. The skirt is shaped and dimensioned to mimic the shape of the interior of the channel. The skirt is attached to the channel via mechanical locking passageways in conjunction with a thermal bonding. The thermal bond is formed by a process wherein the elastomeric sealing member is molded into the housing using a compatible plastic for the housing and a compatible rubbery material for the sealing member.

9 Claims, 3 Drawing Figures

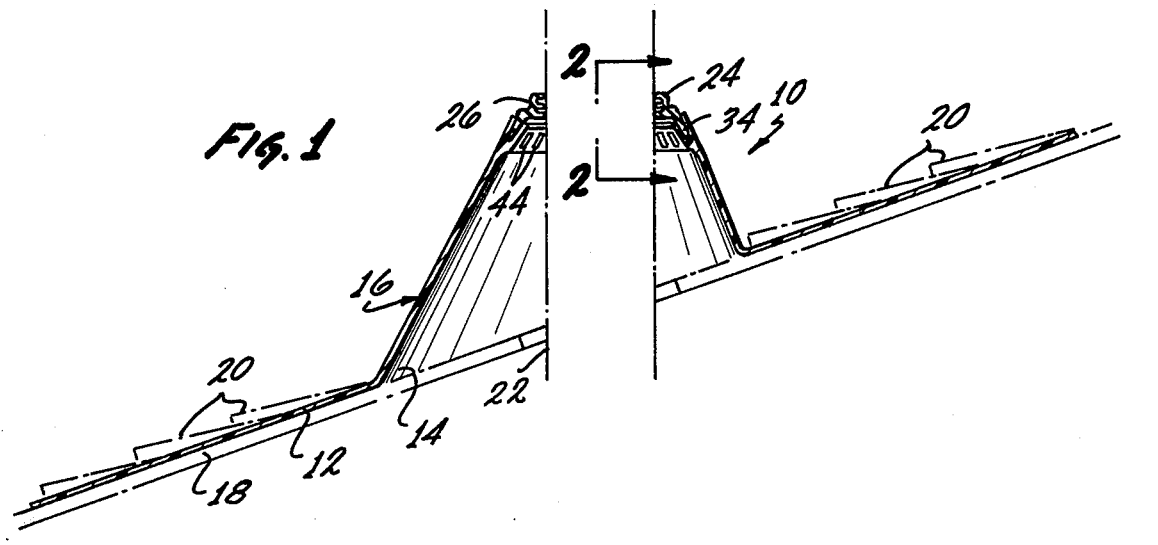
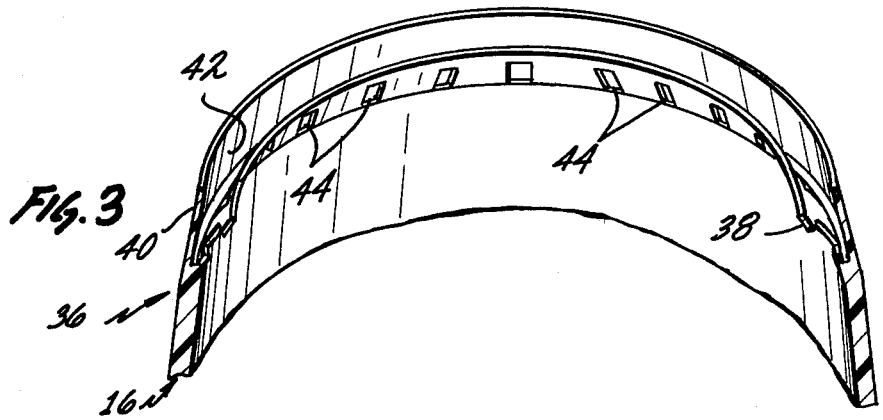
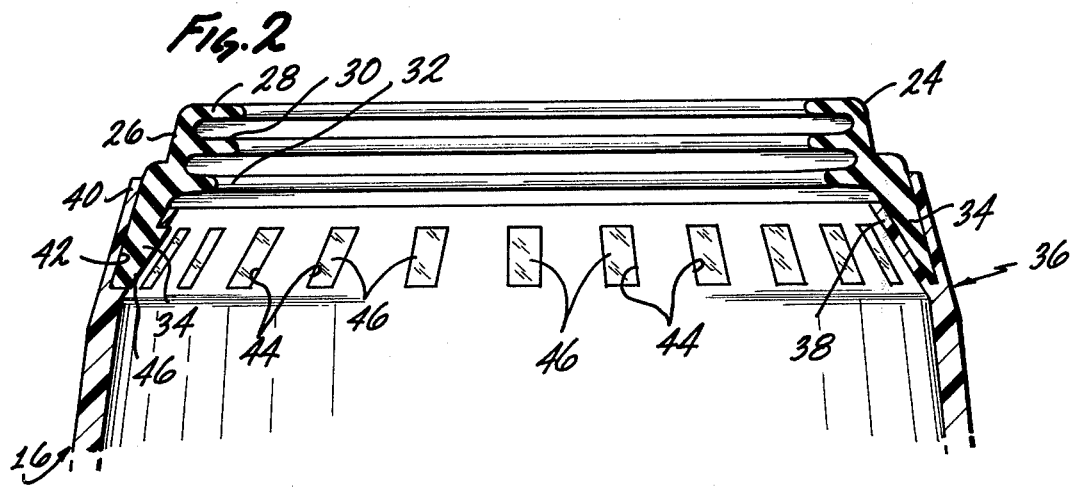

ROOF FLASHING STRUCTURES

CROSS REFERENCE TO RELATED APPLICATIONS

This application is a continuation-in-part of my application Ser. No. 883,420, filed Mar. 6, 1978, now U.S. Pat. Ser. No. 4,160,347 the entire disclosure of which is herein incorporated by reference. Further, this application also is related to my prior U.S. Pat. No. 4,010,578, the disclosure of which is also incorporated by reference.

BACKGROUND OF THE INVENTION

A roof flashing structure is improved by shaping the uppermost periphery of the housing of the flashing such that an elastomeric sealing member can be molded onto the housing and be retained therein by a combination of both a mechanical lock and a thermal bond.

In my prior U.S. Pat. No. 4,010,578 and my patent application Ser. No. 883,420, I described certain roof flashing structures having features which provide them with advantages not found in the old type of flashing structures made of sheet metal and which were sealed to a pipe with calking or other mastic-type materials. While my prior roof flashing structures are improvements over the sheet metal-type previously used it has been found that the plumbers and other construction personnel who install them have a tendency to dislodge the sealing rings from the housing during installation thereof.

For adequate service the housing of a roof flashing structure must be formed of a stiff, resilient material which will maintain its proper shape during both the cold of winter and the heat of summer. However, the sealing member must be formed of a flexible material which can conform with and form a tight seal against the surface of the pipe which moves within the seal as it expands and contracts.

The prior roof flashing structures simply do not meet the criteria wherein the housing and the sealing member must be formed of different types of materials because of their functions and the criteria of a one piece structure having no separate parts which can be lost or dislodged from one another by overzealous construction personnel.

SUMMARY OF THE INVENTION

In view of the above it is considered that there exists a need for a roof flashing structure wherein the housing is formed of rigid material and the sealing member is formed of an elastomeric material, but both materials are integrated together into a single structure. It is therefore a broad object of this invention to fulfill this need. It is a further object of this invention to provide a structure fitting the criteria of the previous sentence which additionally, because of design characteristics, can be mass produced by molding and thus be maintained as an economically priced construction item.

In accordance with these objects and others which will become apparent from the remainder of this specification a roof flashing structure of the type used to form a seal between a roof and a pipe extending through a roof which utilizes a flat plate having a centralized opening of a larger dimension than the pipe and an upstanding tapered housing having an internal dimension larger than said pipe, said housing extending upwardly from said plate and said centralized hole in said plate forming the lowermost opening in said housing is improved by having the uppermost periphery of said housing containing a generally upwardly opening annular channel means dividing said uppermost periphery into an inner annular support means and an outer annular support means; a resilient elastomeric annular sealing means having a generally upstanding annular wall with an annular skirt means projecting downward from said annular wall means and a plurality of sealing flanges extending circularly around said wall and projecting radially toward the center of said sealing means, said flanges each being independently capable of engaging with and forming a seal with said pipe is attached to said housing by said annular skirt means fitting into said annular channel means such that said skirt means fits within said inner and said outer annular support means and said annular skirt means is thermally bonded to at least said inner annular support means which lock the sealing means to said housing preventing said sealing means from separating from said housing.

Further, one or the other of said annular support means, preferably said inner support means, can include a plurality of passageway means which can mechanically lock with a plurality of projections formed on the surface of said skirt means of said sealing member. Along with the mechanical locking achieved between the projections and the passageways a thermal bond can also be formed between the passageways and the projections.

In the preferred method of constructing the roof flashing structures of this invention the housing member is molded using one die and after molding is separated from said die and placed in association with a second die which will define portions of the shape of the sealing member. The sealing member is then molded directly onto the housing and during this process both a mechanical lock which is formed because of the shape of the housing and the sealing member and a thermal or chemical lock which is formed because of the compatibility of the individual materials forming the housing and the sealing member are achieved.

BRIEF DESCRIPTION OF THE DRAWINGS

This invention will be better understood when taken in conjunction with the drawing wherein:

FIG. 1 is a side elevational view in section showing the roof flashing structure of the invention in place on a roof shown in phantom and including a pipe extending through the flashing structure also in phantom;

FIG. 2 is a side elevational view in section about the lines 2—2 of FIG. 1 showing the uppermost portion of the housing in greater detail;

FIG. 3 is a projectional view in section of the uppermost portion of the housing prior to attachment of sealing member to the housing.

The invention shown in the drawing and described in the specification is constructed to incorporate certain principles and concepts as are set forth and defined in the claims appended to this specification. Those skilled in the art to which this invention pertains will realize that these principles and concepts could be utilized in a number of embodiments somewhat differently appearing and differently constructed from the preferred embodiment illustrated in the specification and drawings. For this reason this invention is to be construed in view of the claims and is not to be construed as being limited to the exact embodiment illustrated.

DETAILED DESCRIPTION

The roof flashing structure 10 of the invention has a flat plate 12 having a central hole or opening 14 to which is attached a housing member 16. The flat plate 12 fits flush to the subroofing 18 and shingles or other roofing material 20 are appropriately attached as illustrated in FIG. 1. The housing 16 projects upwardly from the plate 12 at an angle which is slightly oblique to a line perpendicular to the plate 12.

The structure 10 is useful on a variety of roofs having different pitches because of the angle the housing 16 makes with the plate 12. As seen FIG. 1 the right side of the housing 16 is almost perpendicular to the plate 12 while the left side is at approximately a forty-five degree angle. If the pipe 22 projects through a flat roof, then the pipe 22 would be approximately colinear with the right hand side of the housing 16, that is the perpendicular side. If the roof to which the structure 10 was attached was as steep as a forty-five degree angle (a slope of a degree not usually encountered) then the pipe 22 would be colinear with the left hand side of the housing 22.

Because of this wide variation in angles for which the structure 10 is useful the sealing member 24 must be able to adapt to the contours of the pipe 22 and form a watertight seal through a variety of angles between the pipe 22 and the housing 16.

The sealing member 24 is generally constructed having an essentially upstanding wall 26 which has a series of sealing flanges 28, 30 and 32 projecting inwardly from the wall 26 toward the center of the sealing member 24. Preferably the lowermost of these flanges 32 extends inwardly toward the center of the sealing member 24 to a lesser degree than the middle of these flanges 30 which in turn also extends inwardly toward the center to a lesser degree than the uppermost of these flanges 28. This offsetting of the flanges 28 through 32 insures that a weatherproof tight seal is formed between the sealing member 24 and the pipe 22 no matter what angle the pipe 22 is in respect to the sealing member 24.

Extending downward from the upstanding wall 26 of sealing member 24 is an annular skirt 34. The skirt 34 extends obliquely such that its bottom-most periphery forms a larger circle than a circle formed by the locus of a point located near where skirt 34 attaches to the upstanding wall 26. This oblique angle at which the skirt extends is approximately colinear with the sides of the housing 16.

The uppermost periphery 36 of the housing, as best seen in FIG. 3, is divided into two walls, an inner wall 38 and an outer wall 40. The walls 38 and 40 are separated by a channel 42. The shape of the skirt 34 of the sealing member 24 exactly mimics the shape of the channel 42 because of the process wherein the sealing member 24 is formed as hereinafter described. Extending around the inner wall 38 are a plurality of passageways collectively identified by the numeral 44. These passageways 44 extend clear through the inner wall 38 and form a passageway between the channel 42 and the interior of housing.

In constructing the structure 10 the housing including the plate 12 and the inner and outer walls 38 and 40 are molded using suitable molding techniques standard in the art as a one-piece integral unit. This unit is then associated with a proper die in a molding machine and the sealing member 24 is then molded onto the performed housing. Thus the shape of the skirt 34 is dictated by the shape of the channel 42 and during the molding operation projections or tabs of the material from which the sealing member 24 is formed are molded into the passageways 44 to form a plurality of tabs or projections 46 which are molded into the passageways 44. This process both mechanically locks the sealing member 24 to the housing 16 in addition to forming a thermal bond between the material of the housing 16 and the sealing member 24.

Preferably the housing 16 is molded of a thermal plastic such as a polyethylene base TPR thermal plastic. The sealing member 24 is preferably molded of a polyethylene elastomeric material. Since both of these materials have a polyethylene base they are compatible with each other and when subjected to heat during the molding of sealing member 24 the two members become bonded to each other in what could loosely be characterized as a "vulcanization" like process. Not only is the sealing member 24 attached to the housing 16 via the interlocking of the projections 46 with passageway 44, but additionally a thermal formed seal is achieved between the skirt 34 and the outer wall 40 and the points along the inner wall 38 around the passageways 44.

In addition to the method of attaching the sealing member 24 to the housing 16 the shape of the sealing member 24 is such that it contributes to the longevity of the roof flashing structure 10 when actually installed. The upper flange 28 makes an angle slightly larger than a ninety degree angle with the upstanding wall 26. The upstanding wall 26 itself projects upwardly beyond the uppermost periphery 36 of the housing 14. When the flange 28 seals against the pipe 22 this seal is the highest point between the structure 10 and the pipe 22. Any dust or grit which accumulates on the exposed surfaces of either flange 28 or upstanding wall 26 will immediately be washed away from the pipe 22 when the pipe is exposed to rain or snow, etc. or be blown away by wind. Because of the shape of the sealing member 24 in respect to the uppermost portion 36 of the housing 16 there is no recess or crevice for grit to accumulate in. Other prior used roof flashing structures generally have the sealing member recessed within the housing. Dust and grit would therefore tend to accumulate within this recess and would not be washed away by water or blown away by wind. As a pipe expands and contracts when subjected to heat and cold it moves within the sealing member. If dust and grit are retained in any kind of recess between the pipe and sealing member, contraction of the pipe down through the sealing member drags these particles of dust and grit into the space between the pipe and the sealing member thus destroying the efficiency of the sealing member. Because the uppermost flange 28 of the roof flashing structure 10 is not recessed dust and grit tend not to accumulate on it and thus this dust and grit are not pulled into the space between the pipe 22 and the sealing member 24 with the contractions of the pipe 22.

I claim:

1. A roof flashing structure used to form a seal between a roof and a pipe extending through the roof, of the type wherein a generally flat plate having a centralized opening of a larger dimension than said pipe and an upstanding tapered housing having an internal dimension larger than said pipe are integrally formed of a rigid material such that said housing extends upward from said plate and said centralized hole in said plate forms the lowermost opening in said housing the improvement which comprises:

the uppermost periphery of said housing containing a generally upward opening annular channel means dividing said uppermost periphery into an inner annular support means and an outer annular support means;

a resilient elastomeric annular sealing means having a generally upstanding annular wall and an annular skirt means projecting downward from said annular wall, said upstanding annular wall having a plurality of sealing flanges extending circularly around said wall and projecting radially toward the center of said sealing means, said flanges each being independently capable of engaging with and forming a seal with said pipe;

said annular skirt means fitting into said annular channel means so as to position said annular skirt means between said inner annular support means and said outer annular support means;

said annular skirt means being thermally bonded to at least said inner annular support means locking said annular sealing means in said annular channel means and maintaining said annular sealing means fixedly held in said uppermost periphery of said housing;

said annular skirt means and at least said inner annular support means being formed from thermally compatible material such that when contacted in a heated state said thermal bond is formed upon cooling.

2. The roof flashing structure of claim 1 wherein:

said inner annular support means comprises an inner upstanding wall integrally formed with said housing and said outer annular support means comprises an outer upstanding support wall integrally formed with said housing;

said inner upstanding wall and said outer upstanding wall both being concentric about an axis passing longitudinally through said housing, said inner upstanding wall lying inside of said outer upstanding wall.

3. The roof flashing structure of claim 2 wherein:

said annular channel means comprises a channel between said inner upstanding wall and said outer upstanding wall and said skirt means comprises an annular skirt member dimensioned to fit within said channel and sealing against both of said inner upstanding wall and said outer upstanding wall.

4. The roof flashing structure of claim 3 wherein:

said inner upstanding wall includes a plurality of passageways spaced around said inner upstanding wall, said passageways forming a plurality of openings between said annular channel and the interior of said housing;

said annular skirt including a plurality of projection means equal in number to said passageways and spaced about said annular skirt in an array identical to the spacing of said passageways, said projection means fitting into and filling said passageways forming a mechanical bond between said annular skirt and said inner upstanding wall.

5. A roof flashing structure used to form a seal between a roof and a pipe extending through the roof, of the type wherein a generally flat plate having a centralized opening of a larger dimension than said pipe and an upstanding tapered housing having an internal dimension larger than said pipe are integrally formed of a rigid material such that said housing extends upward from said plate and said centralized hole in said plate forms the lowermost opening in said housing the improvement which comprises:

the uppermost periphery of said housing containing a generally upward opening annular channel means dividing said uppermost periphery into an inner annular support means and an outer annular support means;

a resilient elastomeric annular sealing means having a generally upstanding annular wall and an annular skirt means projecting downward from said annular wall, said upstanding annular wall having a plurality of sealing flanges extending circularly around said wall and projecting radially toward the center of said sealing means, said flanges each being independently capable of engaging with and forming a seal with said pipe;

said annular skirt means fitting into said annular channel means so as to position said annular skirt means between said inner annular support means and said outer annular support means;

said annular skirt means being thermally bonded to at least said inner annular support means locking said annular sealing means in said annular channel means and maintaining said annular sealing means fixedly held in said uppermost periphery of said housing;

said inner annular support means comprises an inner upstanding wall integrally formed with said housing and said outer annular support means comprises an outer upstanding support wall integrally formed with said housing;

said inner upstanding wall and said outer upstanding wall both being concentric about an axis passing longitudinally through said housing, said inner upstanding wall lying inside of said outer upstanding wall;

said annular channel means comprises a channel between said inner upstanding wall and said outer upstanding wall and said skirt means comprises an annular skirt member dimensioned to fit within said channel and sealing against both of said inner upstanding wall and said outer upstanding wall;

said inner upstanding wall includes a plurality of passageways spaced around said inner upstanding wall, said passageways forming a plurality of openings between said annular channel and the interior of said housing;

said annular skirt including a plurality of projection means equal in number to said passageways and spaced about said annular skirt in an array identical to the spacing of said passageways, said projection means fitting into and filling said passageways forming a mechanical bond between said annular skirt and said inner upstanding wall;

said housing including said inner and said outer support walls is formed of a polyethylene base thermal plastic and said resilient elastomeric sealing means is formed of a polyethylene base rubber such that when said polyethylene based rubber in a heated state contacts said polyethylene based plastic, upon cooling a bond is formed between said rubber and said plastic.

6. The roof flashing structure of claim 5 wherein:

said channel is V-shaped in cross-section and said inner upstanding wall and said outer upstanding wall both are upstanding essentially straight walls forming the sides of said V-shaped channel:

said annular skirt is V-shaped in cross-section having a shape exactly corresponding to the shape of said channel and fitting within said channel such that there is no void space between said skirt and said inner upstanding wall and said outer upstanding wall.

7. The roof flashing structure of claim 6 wherein: said plurality of sealing flanges are positioned one above another and the uppermost of these flanges meets with and is integrally formed with the uppermost periphery of said sealing means annular wall such that said uppermost flange and said annular wall form an angle with each other of at least ninety degrees.

8. The roof flashing structure of claim 7 wherein: at least said uppermost flange and the portion of said annular wall wherein said uppermost flange is attached project above the uppermost periphery of said housing.

9. A roof flashing structure used to form a seal between a roof and a pipe extending through the roof, of the type wherein a generally flat plate having a centralized opening of a larger dimension than said pipe and an upstanding tapered housing having an internal dimension larger than said pipe are integrally formed of a rigid material such that said housing extends upward from said plate and said centralized hole in said plate forms the lowermost opening in said housing the improvement which comprises:

the uppermost periphery of said housing containing an upwardly opening annular channel circumscribing around said uppermost periphery and dividing said uppermost periphery into an outer peripheral wall and an inner wall;

said inner wall including a plurality of passageways spaced around said inner wall, said passageways forming a plurality of openings between said annular channels and the interior of said housing;

a resilient elastomeric sealing member having a generally upstanding annular wall and an annular skirt extending downwardly around said wall, said annular wall including a plurality of sealing flanges extending circularly around said wall and projecting radially toward the center of said sealing member, said flanges each being independently capable of engaging with and forming a seal with said pipe;

said skirt including a plurality of projections equal in number and shape to said passageways, said projections projecting from said skirt toward the center of said sealing means;

said skirt fitting into said annular channel and said plurality of projections fitting into said passageways such that said sealing means is fixedly held in said channel by the interaction of said projections with said passageways;

said housing and said sealing means are formed from thermally compatible material such that when said sealing means in a heated state is fitted into said housing a thermal bond is formed upon cooling between said sealing means and said housing.

* * * * *